Jan. 12, 1960 C. H. HESS 2,920,912
ADJUSTABLE LINK
Original Filed July 11, 1955 2 Sheets-Sheet 1
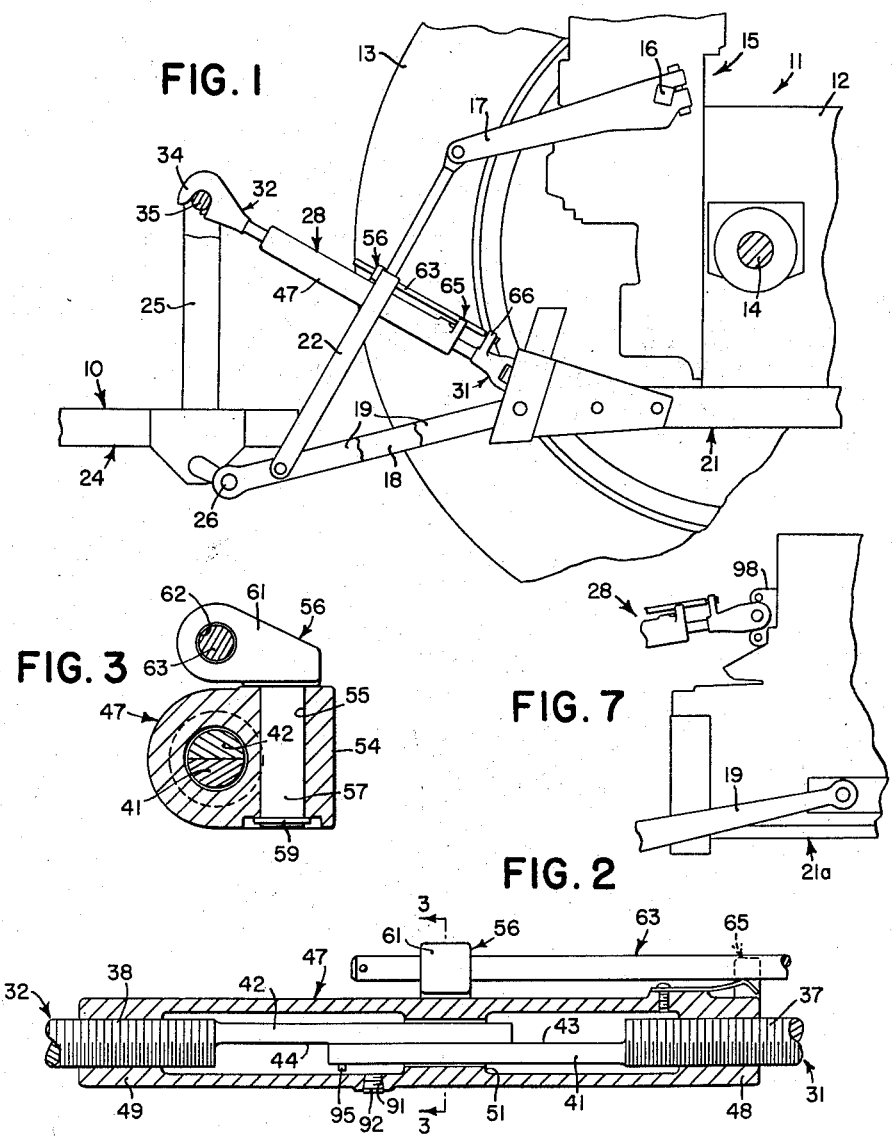
INVENTOR.
CHRISTIAN H. HESS
BY
ATTORNEYS Jan. 12, 1960

C. H. HESS 2,920,912

ADJUSTABLE LINK

Original Filed July 11, 1955

INVENTOR.
CHRISTIAN H. HESS
BY
*C. T. Parker & R. C. Johnson*
ATTORNEYS

United States Patent Office
2,920,912
Patented Jan. 12, 1960

2,920,912
ADJUSTABLE LINK

Christian H. Hess, Waterloo, Iowa, assignor, by mesne assignments, to Deere & Company, a corporation of Delaware Continuation of application Serial No. 521,271, July 11, 1955. This application May 12, 1958, Serial No. 734,687

10 Claims. (Cl. 287—60)

This application is a continuation of my co-pending application, Ser. No. 521,271, filed July 11, 1955, for Adjustable Link (now abandoned).

The present invention relates generally to agricultural implements and more particularly to hitch devices for connecting an implement with a tractor.

The object and general nature of the present invention is the provision of a new and improved adjustable link adapted to be incorporated in the connection between an implement and a tractor, particularly such connections as are commonly referred to as a three-point hitch where the upper link is to be used for adjusting the position of the implement with respect to the tractor. More specifically, it is a feature of this invention to provide an adjustable link with new and improved means for locking the link in different positions of adjustment, as desired, which means is also adapted to be used in changing the position or adjustment of the link parts.

These and other objects and advantages of the present invention will be apparent to those skilled in the art after a consideration of the following detailed description, taken in conjunction with the accompanying drawings, in which:

Fig. 1 is a fragmentary side view of the rear portion of a tractor and the forward portion of an associated implement, in which has been incorporated an adjustable link embodying the particular features of the present invention.

Fig. 2 is a fragmentary enlarged sectional view taken through the principal portions of the adjustable link shown in Fig. 1, the section of Fig. 2 being taken along a vertical generally longitudinally extending plane passing through the adjustable link.

Fig. 3 is a generally transverse view taken along the line 3—3 of Fig. 2, certain parts being shown in elevation for purposes of clarity.

Fig. 7 is similar to Fig. 1 but shows the link of the present invention as connected with the tractor at a different location.

Figure 5:
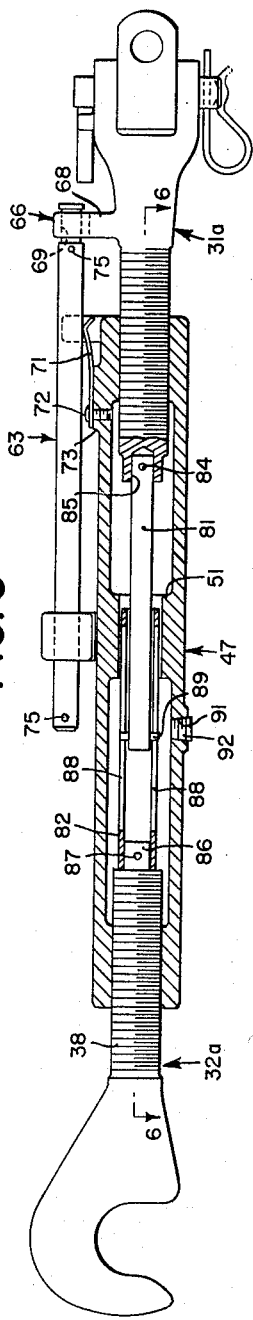
Fig. 5 is a view similar to Fig. 2, showing a modified form of construction.

Referring first to Fig. 1, the present invention is shown as incorporated in a hitch linkage of the generally three-point type arranged to connect an implement 10 to a propelling and supporting tractor 11. The tractor 11 is generally of conventional construction, so far as the principles of the present invention are concerned, and embodies a main frame and transmission housing 12, rear drive wheels 13, mounted respectively on axle shafts 14, and a power lift unit 15 that includes a transverse power lift rockshaft 16 and a lift arm 17 at each side of the tractor. The tractor 11 is also provided with a pair of lower draft links 18 and 19 connected in any suitable way to the drawbar support 21 of the tractor. The draft links 18 and 19 are adapted to be raised and lowered by a pair of lift links 22 that are connected at their lower ends with the draft links 18 and 19 and at their upper ends with the lift arms 17 of the power lift unit 15. The implement 10, shown fragmentarily in Fig. 1, may be any one of a variety of implements that are adapted to be connected with the tractor 11, the implement 10 as illustrated in Fig. 1 being a tractor-mounted plow including a frame structure 24 that at its forward end is provided with a mast section 25 and a pair of lower attaching studs 26 to which the rear ends of the draft links 18 and 19 are adapted to be connected in any suitable way. The upper portion of the mast structure 25 of the implement 10 is connected with the tractor 11 through an upper link means 28 that forms the principal portion of the present invention.

The adjustable link 28 comprises a turnbuckle-like structure which includes front and rear end members 31 and 32 the front member 31 being adapted to be swivelly connected with the tractor at any suitable location. For example, Fig. 1 shows the adjustable link 28 arranged to provide a generally rearwardly disposed hitch point, which may under certain conditions be desirable, as when operating over ridges, through swales and the like, while Fig. 7 shows the link 28 connected with the tractor at a point substantially directly above the connection of the lower links 18 and 19 with the tractor, which is the preferred arrangement for many conditions of operation. The link 28 may, of course, be connected with the tractor at other points, as desired. The rear end member 32 is provided with a hook 34 that is adapted to be engaged over a stud or ball-type connector 35 that is carried by the upper end of the mast structure 25.

As best shown in Fig. 2, the end members 31 and 32 include exteriorly screw threaded sections 37 and 38, respectively, and also telescopically associated or overlapping sections 41 and 42. The sections 41 and 42 are formed with flat interengaging surfaces 43 and 44 that provide for in and out sliding movement of one end member relative to the other, but as long as the flat surfaces 43 and 44 are held in contact, neither of the members 31 and 32 can rotate relative to the other, as will be clear from Fig. 3. To hold the surfaces 43 and 44 in contact with one another, suitable means is provided, as will be explained below.

Surrounding the two end members 31 and 32, particularly the overlapping or telescopically associated sections 41 and 42, is a rotatable sleeve member 47 having end sections 48 and 49 that are internally threaded to engage the threaded sections 37 and 38, respectively, these threaded portions being of opposite hand whereby rotation of the sleeve member 47 in one direction or the other tends to retract or extend the end members 31 or 32 which are normally held against rotation by virtue of their connections with the tractor and/or the implement. The central portion of the sleeve member 47 is formed with a radially inwardly extending boss secion 51 that serves as a collar, as best shown in Fig. 2, surrounding the telescopically associated overlapping sections 41 and 42 so as to hold them with their faces 43, 44 in contact. Not only does this keep the members 31 and 32 from rotating one relative to the other, but also, it aids in holding the threaded sections 37 and 38 in axial alignment and in proper threaded connection with the ends 48 and 49 of a sleeve 47.

The sleeve member 47 is provided with a laterally extended boss 54 having a cross bore 55 formed therein to receive a swivel member 56, the shank 57 of which is pivotally or rotatably mounted in the boss sector 54, being held in place by a spring ring 59 or other suitable means. The swivel member 56 includes a head section 61 that is apertured transversely, as at 62, to receive an operating part in the form of a rod or bar 63 that is slidable within the opening 62. The swivel member 56 is so formed that when the parts are arranged as shown in Figs. 2 and 3, the operating part 63, shown in these figures as extending longitudinally alongside the sleeve member 47, is disposed in the same vertical longitudinal extending plane as the relatively slidable end members 31 and 32.

When it is desired to adjust the link 28, the operating part 63 is swung around into a transverse position so that the part 63 may then be used as a handle to turn the sleeve member 47 relative to the end members 31 and 32. In this way, any necessary adjustment in the effective length of the link 28 may readily and easily be made.

Figure 4:
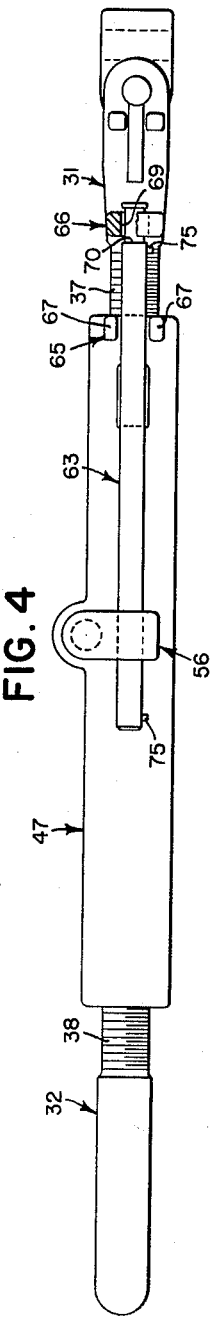
Fig. 4 is a top or plan view of the construction shown in Figs. 1 and 2.

In order to lock the sleeve member 47 against rotation relative to the end members 31 and 32, means is provided on one end of the sleeve member 47 and cooperates with means on one of the end members, such as the end member 31, to receive and hold the operating bar 63 in its longitudinal position, so that relative rotation between the sleeve member 47 and the end members is prevented. Such locking means comprises a first part-receiving abutment means 65 on the forward end of the sleeve member 47 and a second abutment means 66 on the forward end member 31. The abutment means 65 comprises a pair of laterally spaced apart lugs 67, forming bifurcated means adapted to receive the operating member 63. When the latter is swung around into a position longitudinally of the sleeve 47, as best shown in Fig. 4. The abutment means 66 includes an apertured boss 68, the aperture 69 of which is slightly greater than the diameter of the operating member 63, as best shown in Fig. 4. The adjacent end of the member 63 is reduced in diameter, as shown at 70 (Fig. 5), which thereby forms a notched section that is adapted to be locked to the apertured boss 68. This is effected by means of a spring 71 carried by the adjacent end of the sleeve member 47, the spring 71 preferably being secured by a rivet 72 or the like to a boss 73 on the sleeve member 47. The spring 71, taken with the boss 68 and associated reduced portion 79, constitutes spring means acting to releasably hold the operating member in locking position. The operating part 63 may be disengaged from the boss 68 by pressing downwardly a slight amount on the forward end of the member 63 and then shifting the same axially rearwardly to disengage the notched end 70 from the boss aperture 69. The operating part 63 is held against accidental detachment from the swivel member 56 by a pair of pins 75 fixed in the end portions of the member 63.

Figure 6:
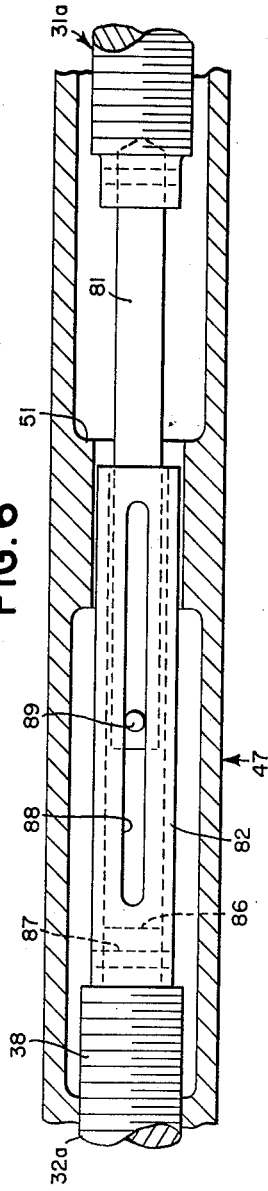
Fig. 6 is an enlarged generally central section taken generally along the plane of the line 6—6 of Fig. 5.

A modified form of the present invention shown in Figs. 5 and 6 is quite similar to the form of the invention shown in Figs. 1–4, and parts in common in the two modifications are indicated by the same reference numerals. In the modified form shown in Figs. 5 and 6, the end parts 31a and 32a do not have the overlapping part shown at 41 and 42 in Fig. 3, but instead, the end members 31a and 32a have affixed thereto a rod member 81 and a cooperating tubular member 82, respectively. The rod member 81 is fixed to the part 31a by means of a pin 84 and seats in a socket 85 formed in the inner end of the part 31a, as shown in Fig. 5. The other part 32a is provided with a reduced section 86 that is apertured to receive a pin 87 that fixes the adjacent end of the tubular member 82 thereto. The latter member is provided with opposite slots 88 in which a pin 89, carried by the inner member of the rod 81, extends. These telescopically associated parts 81 and 82 form overlapping sections, that, like the sections 41 and 42 described above, act not only to prevent the parts 31a and 32a from rotating, one relative to the other, but also aid in holding the parts 31a and 32a in proper alignment. During assembly of the parts shown in Figs. 5 and 6, the pin 89 is inserted through an opening 91 in the wall of the sleeve member 47, which opening is closed by a plug 92 after the pin 89 has been secured in place. It will also be seen from Fig. 5, that the boss section 51 of the sleeve member 47 acts to hold the overlapping or telescopically associated parts 81 and 82 against lateral displacement.

In Figs. 5 and 6, the pin 89, operating in the slots 88, limit the extension of the members 31 and 32 and thus prevent them from becoming disconnected from the sleeve 47. In a similar way, a pin 95 (Fig. 2) fixed in the end of the flattened section 41 cooperates with the boss 51 formed interiorly in the sleeve member 47, prevents over extension of the parts 31 and 32. The pin 95 is inserted in the section 41 (Fig. 2) by bringing the same into position through the opening 91, substantially as described above.

In Fig. 7, the lower links are connected to the tractor drawbar support 21a, and the upper link 28 is connected to a part 98 on the tractor, which may be a portion of the tractor power lift mechanism. In this arrangement, the link 28 transmits forward thrust to the draft responsive mechanism of the tractor.

While I have shown and described above the preferred structure in which the principles of the present invention have been incorporated, it is to be understood that my invention is not to be limited to the particular details, shown and described above, but that, in fact, widely different means may be employed in the practice of the broader aspects of my invention.

What I claim, therefore, and desire to secure by Letters Patent is:

1. An adjustable link comprising a pair of exteriorly and oppositely threaded end members, a rotatable sleeve member having interiorly and oppositely threaded portions receiving the threaded portions of said end members, and operating part movably mounted on said sleeve member and shiftable generally longitudinally of said sleeve member into a position to engage one of said end members, the portion of said operating part adjacent one end member having a notched portion, an apertured boss on said one end member to receive the notched portion of said operating part, and a spring acting against said operating part for releasably holding the latter notched portion engaged with said apertured boss.

2. An adjustable link comprising a pair of relatively shiftable end parts, a rotatable sleeve member having threaded connection with said parts, a locking member mounted for longitudinal sliding movement axially on said sleeve member, means on one of said end parts to receive said locking member when the latter is shifted along said sleeve member into engagement with said one end part, and means connected with said end parts and disposed within said sleeve member to prevent rotation of one relative to the other.

3. An adjustable link comprising a pair of relatively shiftable end parts, a rotatable sleeve member having oppositely threaded connection with said parts, a swivel carried by said sleeve member for rotary movement relative thereto about a transverse axis, a locking member movably carried by said swivel and slidable relative to the latter in a direcction transversely of said axis, a first abutment section adjacent one end of said sleeve member and aligned longitudinally of said sleeve member with said locking member when the latter lies alongside said sleeve member, whereby said locking member may be shifted into connection with said abutment means and thereby prevent rotation of said swivel, a second abutment section on the end part adjacent said one end of said sleeve member and adapted to receive said locking member for locking said sleeve member against rotation, and the end of said slidable locking member adjacent said second abutment having a notched portion adapted to engage the second abutment so as to be held thereby against movement along the sleeve member out of locking engagement with the second abutment.

4. An adjustable link comprising a pair of end members, having, adjacent their outer ends, exteriorly and oppositely threaded portions, said threaded portions being circumferentially continuous through 360° and said members having, axially inwardly of said threaded portions, inner end sections arranged in overlapping slidable but non-rotatable relation, and a rotatable sleeve member having at each end a screw threaded portion receiving the associated exterior screw threaded section on the associated end member, said sleeve member having a generally centrally arranged radially inwardly extending boss section embracing and encircling the overlapping portions of the inner sections of said end members and cooperating with said inner sections for holding the screw threaded sections in axial alignment.

5. An adjustable link comprising a pair of exteriorly and oppositely threaded end members, a rotatable sleeve member having axially spaced interiorly and oppositely threaded portions receiving the threaded portions of said end members, said threaded portions being circumferentially continuous through 360° and said exteriorly threaded members having, axially inwardly of said threaded portions, inner end sections arranged in overlapping slidable but non-rotatable relation, and means to rotate said sleeve member.

6. An adjustable link comprising a pair of end members, having, adjacent their outer ends, exteriorly and oppositely threaded portions, said threaded portions being circumferentially continuous through 360° and said members having, axially inwardly of said threaded portions, inner end sections arranged in overlapping slidable but non-rotatable relation, and a rotatable sleeve member having at each end a screw threaded portion receiving the associated exterior screw threaded section on the associated end member.

7. An adjustable link comprising a pair of end members, having, adjacent their outer ends, exteriorly and oppositely threaded portions, said threaded portions being circumferentially continuous through 360° and said members having, axially inwardly of said threaded portions, inner end sections arranged in overlapping slidable but non-rotatable relation, a rotatable sleeve member having at each end a screw threaded portion receiving the associated exterior screw threaded section on the associated end member, and means on the interior of said sleeve member and engaging the overlapping portions of the inner sections of said end members and cooperating with said inner sections for holding the screw threaded sections in axial alignment.

8. An adjustable link comprising a pair of end members, having, adjacent their outer ends, exteriorly and oppositely threaded portions, said threaded portions being circumferentially continuous through 360° and said members having, axially inwardly of said threaded portions, inner end sections arranged in overlapping slidable but non-rotatable relation, said overlapping sections including a slotted tubular part and a rod disposed within said tubular part and having means engaging in the slot of said tubular part, whereby said overlapping sections act to hold said end members against relative rotation.

9. The invention set forth in claim 8, further characterized by the slotted part having slot ends cooperating with said pin means to limit the relatively outward extension of said end members.

10. An adjustable link comprising a pair of end members, having, adjacent their outer ends, exteriorly and oppositely threaded portions, said threaded portions being circumferentially continuous through 360° and said members having, axially inwardly of said threaded portions, inner end sections arranged in overlapping slidable relation, and means connected with said overlapping sections for limiting the relatively outward extension of said end members.

References Cited in the file of this patent

UNITED STATES PATENTS

| | | |
|---|---|---|
| 310,767 | Wilson | Jan. 13, 1885 |
| 2,299,526 | Claud-Mantle | Oct. 20, 1942 |
| 2,648,997 | Sawyer | Aug. 18, 1953 |
| 2,844,397 | Du Shane | July 22, 1958 |